(12) United States Patent
Park et al.

(10) Patent No.: US 7,940,760 B2
(45) Date of Patent: May 10, 2011

(54) METHOD AND APPARATUS FOR DISCOVERING COMPONENT IN AT LEAST ONE SUB-NETWORK

(75) Inventors: Sang Do Park, Yongin-si (KR); Jun Hyeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 11/785,835

(22) Filed: Apr. 20, 2007

(65) Prior Publication Data

US 2008/0144631 A1 Jun. 19, 2008

(30) Foreign Application Priority Data

Dec. 14, 2006 (KR) .................. 10-2006-0127896

(51) Int. Cl.
*H04L 12/28* (2006.01)
(52) U.S. Cl. ........ 370/389; 370/254; 370/255; 370/351; 370/400; 370/401
(58) Field of Classification Search ............. 370/254, 370/255, 389, 351, 400, 401
See application file for complete search history.

(56) References Cited

U.S. PATENT DOCUMENTS

| | | | | |
|---|---|---|---|---|
| 5,812,531 A * | 9/1998 | Cheung et al. | ............ | 370/255 |
| 7,009,941 B1 * | 3/2006 | Uchino | ............ | 370/254 |
| 7,317,693 B1 * | 1/2008 | Roesch et al. | ............ | 370/252 |
| 7,450,598 B2 * | 11/2008 | Chen et al. | ............ | 370/409 |
| 7,720,006 B1 * | 5/2010 | Yadav | ............ | 370/255 |
| 2005/0018687 A1 | 1/2005 | Cutler | | |
| 2005/0174950 A1 * | 8/2005 | Ayyagari | ............ | 370/254 |
| 2006/0031570 A1 * | 2/2006 | Blackwell et al. | ............ | 709/238 |
| 2006/0072465 A1 | 4/2006 | Scoggins et al. | | |
| 2006/0092860 A1 * | 5/2006 | Higashitaniguchi et al. | . | 370/255 |
| 2006/0117101 A1 * | 6/2006 | Lauer et al. | ............ | 709/224 |
| 2007/0064689 A1 * | 3/2007 | Shin et al. | ............ | 370/389 |
| 2007/0147268 A1 * | 6/2007 | Kelley et al. | ............ | 370/254 |
| 2007/0165532 A1 * | 7/2007 | Retana et al. | ............ | 370/241 |

FOREIGN PATENT DOCUMENTS

| | | |
|---|---|---|
| EP | 1 043 871 A3 | 9/2002 |
| KR | 1994-7002031 A | 6/1994 |
| KR | 10-2004-0090221 A | 10/2004 |
| KR | 10-2004-0090222 A | 10/2004 |
| KR | 10-2004-01043011 A | 12/2004 |
| KR | 10-2005-0057214 A | 6/2005 |
| KR | 10-2006-0033558 A | 4/2006 |
| WO | 93/05599 A1 | 3/1993 |
| WO | WO 2004/004380 A1 | 1/2004 |

OTHER PUBLICATIONS

Notice of Allowance, KR Patent Application No. 10-2006-0127896, mailed on Nov. 28, 2007.

* cited by examiner

*Primary Examiner* — Pankaj Kumar
*Assistant Examiner* — Gautam Sharma
(74) *Attorney, Agent, or Firm* — Sughrue Mion, PLLC

(57) ABSTRACT

A method of discovering a component in a sub-network, the method including: receiving unique information on at least one component included in a first sub-network of a network by a first component in the first sub-network; and broadcasting the unique information on the at least one component to a second sub-network of the network, by joining the first component in the second sub-network.

18 Claims, 8 Drawing Sheets

METHOD AND APPARATUS FOR DISCOVERING COMPONENT IN AT LEAST ONE SUB-NETWORK

CROSS-REFERENCE TO RELATED APPLICATIONS

This application claims priority from Korean Patent Application No. 10-2006-0127896, filed on Dec. 14, 2006, in the Korean Intellectual Property Office, the entire disclosure of which is incorporated herein by reference.

BACKGROUND OF THE INVENTION

1. Field of the Invention

Methods and apparatuses consistent with the present invention relate to a communication between sub-networks, and more particularly, to discovering a component in a sub-network.

2. Description of Related Art

Generally, when two components which are different from each other communicate, a recognition process is previously required. For a previous recognition process, records of previous communications should physically exist or information on components to communicate should be acquired via other paths.

An address and a port number of a corresponding device are required so that communications among components using an Internet protocol (IP) address system are performed in the Internet. IP addresses and identifiers of all components, directly connected to the Internet, are registered in a domain name system (DNS), and thus another component may ascertain the addresses from the identifiers with respect to the components. Also, port numbers are standardized so that a predetermined port may receive from only other ports having the same port number.

In this instance, the IP addresses indicate unique identification addresses which are provided to all networks connected to the Internet, and computers, connected to the networks.

However, disadvantages of communications among components included in different sub-networks are as follows.

First, as an example, when a component has an IP address allocated as in an ad hoc network, the component does not always have a same IP address. Accordingly, components of different sub-networks may not communicate. Specifically, when building an ad hoc network, IP addresses may not be ascertained via DNS.

Second, in a related art, a separate action by routers to process multicast packets is required for discovering components in sub-networks, which causes loss of time and cost.

Accordingly, a more effective method and apparatus for discovering a component in at least one sub-network is needed.

SUMMARY OF THE INVENTION

The present invention provides a method and apparatus for discovering a component in a sub-network of a network where a single component stores unique information of all components in a previously joined network in a storage space of a context distinguishing a plurality of sub-networks, transmits the unique information to a newly joined network, and thereby may discover all components in other networks.

The present invention also provides a method and apparatus for discovering a component in at least one sub-network which may discover the component in sub-networks which are different from each other, without a separate router function or an additional action by a user.

The present invention also provides a method and apparatus for discovering a component in at least one sub-network which discovers a component, which has a random Internet protocol (IP) address and a component not registered in a domain name system (DNS), and enable the DNS and the method of discovering a component according to an exemplary embodiment of the present invention to be used independently and simultaneously, although a device or a component is already registered in the DNS.

According to an aspect of the present invention, there is provided a method of discovering a component in a sub-network, the method including: receiving unique information on at lest one component included in a first sub-network of a network by a first component in the first sub-network; and broadcasting the unique information on the at least one component to a second sub-network of the network, by joining the first component in the second sub-network.

According to another aspect of the present invention, the broadcasting of the unique information on the at least one component to a second sub-network is performed using a wireless communication method without joining the first component in the second sub-network.

According to another aspect of the present invention, there is provided an apparatus for discovering a component in a sub-network, the apparatus including: a receiving unit which receives unique information on at least one component included in a first sub-network of a network, and a first context on the first sub-network; a storage unit which stores at least one of the received unique information and the received first context; and a control unit which broadcasts the stored unique information in a second sub-network of the network.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings, in which.

DETAILED DESCRIPTION OF EXEMPLARY EMBODIMENTS

Figure 1:
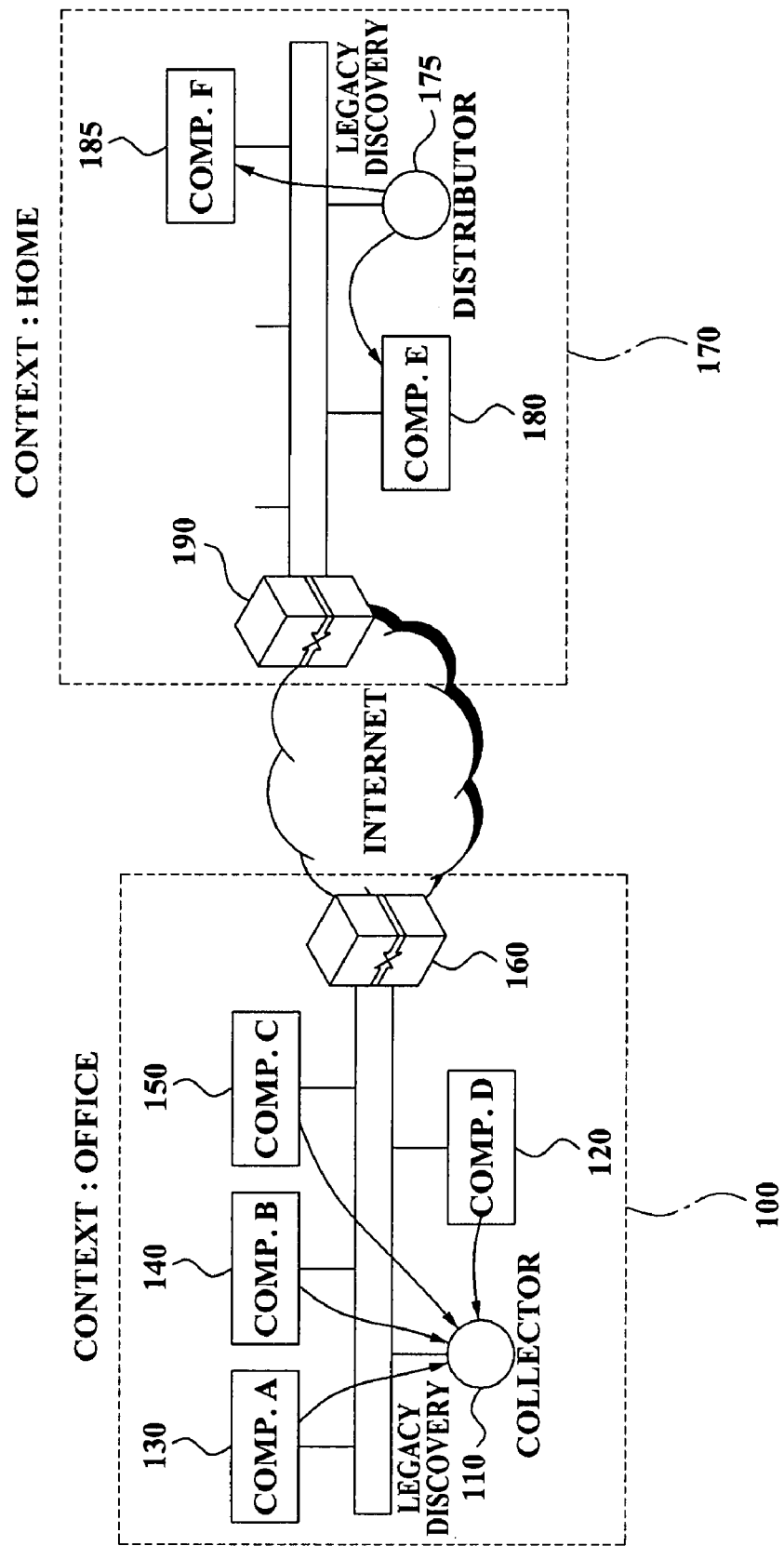
FIG. 1 is a diagram illustrating a sub-network system including an apparatus for discovering a component in at least one sub-network according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a sub-network system including an apparatus for discovering a component in at least one sub-network according to an exemplary embodiment of the present invention. Hereinafter, referring to FIG. 1, at least two sub-network systems including the apparatus for discovering a component in at least one sub-network is described.

As illustrated in FIG. 1, a first network 100 and a second network 170 exist, and are examples of a sub-network. It may be assumed that more sub-networks exist. The first network 100 has a context of an office, the second network 170 has a context of a home, and thus the first network 100 and the second network 170 may be differentiated.

Particularly, according to an exemplary embodiment of the present invention, the first network 100 and the second network 170 use an ad hoc network or a home network, and a multicast discovery method may be used. In the present specification, a sub-network may be referred to as a network.

The first network 100 includes a collector 110, a component D 120, a component A 130, a component B 140, a component C 150, and a local information center 160. The second network 170 includes a distributor 175, a component E 180, a component F 185, and a local information center 190. In this instance, the local information center may not exist in each network.

The local information center refers to a component where component information is not changed in each sub-network, and may be designed to be operated as a gateway.

According to an exemplary embodiment of the present invention, a random component used as the collector 110 in one network as illustrated in FIG. 1 is used as the distributor 175 when the component moves to another network. Specifically, one component may alternately function as the distributor 175 and the collector 110. Also, the distributor 175 and the collector 110 indicate an apparatus for discovering a component in at least one sub-network according to an exemplary embodiment of the present invention. Detailed descriptions will be described with reference to FIGS. 2 through 8.

Figure 2:
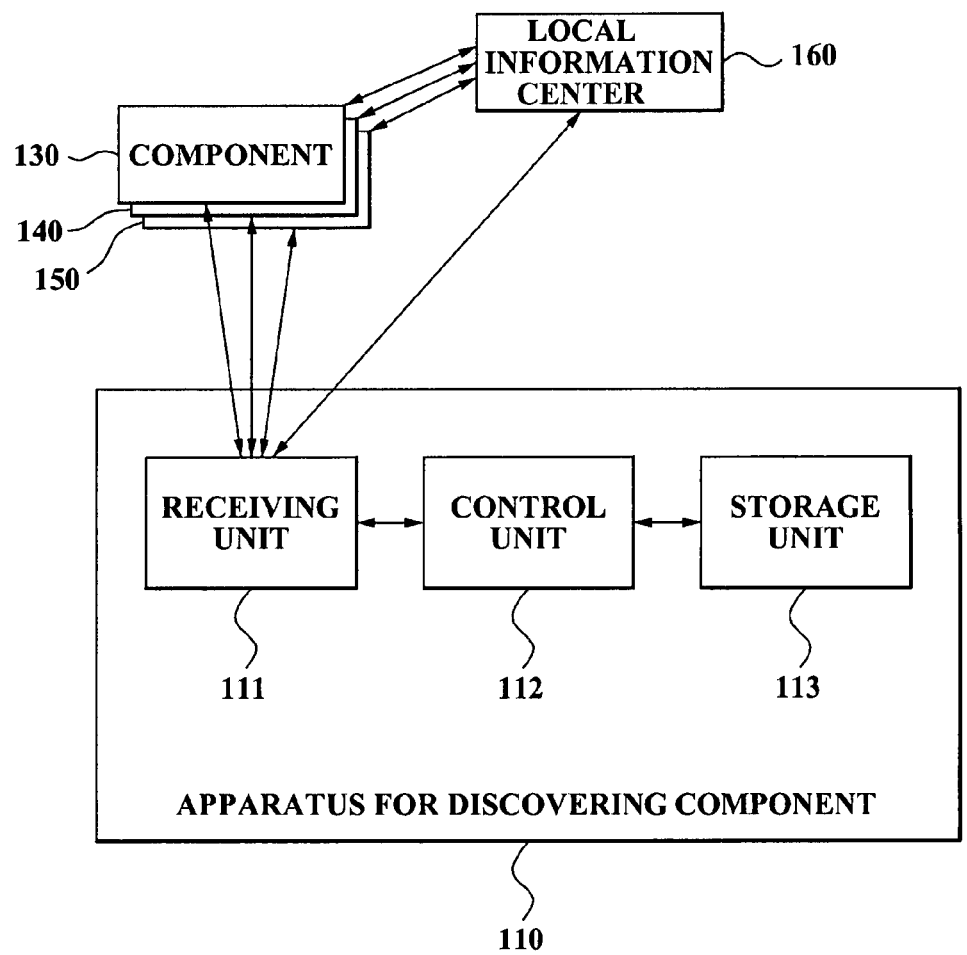
FIG. 2 is a block diagram illustrating an apparatus for discovering a component in at least one sub-network according to an exemplary embodiment of the present invention.

FIG. 2 is a block diagram illustrating an apparatus for discovering a component in at least one sub-network according to an exemplary embodiment of the present invention. Hereinafter, referring to FIG. 2, the apparatus for discovering a component in at least one sub-network, i.e. a collector/distributor according to an exemplary embodiment of the present invention, is described.

As illustrated in FIG. 2, the apparatus for discovering a component in at least one sub-network 110 includes a receiving unit 111, a control unit 112, a storage unit 113, and the like. As described above, the apparatus for discovering a component in the at least one sub-network 110 may be a random component in the sub-network. In the present specification, the component indicates a device which may be connected to other components in the sub-network, for example, a cellular phone, a digital camera, a printer, a notebook personal computer (PC), and the like.

The receiving unit 111 receives unique information and a first context of the first network 100, from components included in a first network 100 of a plurality of networks. Also, the receiving unit 111 outputs the unique information and the first context to the storage unit 113. In this instance, a single network instead of the plurality of networks may apply to an exemplary embodiment of the present invention. The unique information includes at least one of an Internet protocol (IP) address, an identifier, and a port number of all components included in the first network 100 where the apparatus for discovering a component in the at least one sub-network 110 is included. Also, the first context may indicate an identifier to be differentiated using a location, a sub-structure, and an address of the first network 100, or a predetermined name which is given by a user.

The storage unit 113 receives the unique information from the receiving unit 111, stores the received unique information in a storage space, and provides the stored unique information to the control unit 112 according to a control of the control unit 112. A block, which may store data temporarily or permanently, may be the storage unit 113, for example, a flash memory, a hard disk drive (HDD), and a memory card.

The control unit 112 receives the first context via the receiving unit 111, and generates the storage space including the first context, in the storage unit 113. In this instance, the process of generating the storage space includes mapping unique information on a component included in a network to a context indicating the network and storing the unique information on the component in the context.

The control unit 112 controls the unique information to be stored in the storage space when the storage space including the first context exists. Also, the control unit 112 discovers the components included in the first network 100 in a multicast discovery method, and compares unique information on the discovered components and the unique information in the storage unit 113. As a result of the comparison, the control unit 112 may update the unique information in the storage unit 113.

The control unit 112 receives identifications (IDs) of the components, from the components included in the first network 100, via the receiving unit 111. Also, the control unit 112 confirms whether the components correspond to a local information center 160 using the received ID. As described above, the local information center 160 is referred to as a component where the unique information on the component in the first network 100 is not changed, and transmits connection status information on the components in the first network 100.

The control unit 112 confirms whether the local information center 160 transmitting the connection status information on the components in the first network 100 exists. As a result of the confirmation, the control unit 112 may acquire the connection status information on the components in the first network 100. Also, the unique information may be updated according to the acquired connection status information on the components in the first network 100.

The control unit 112 controls the local information center 160 to request the connection status information on the components in the first network 100 via the receiving unit 111, when the local information center 160 exists. Also, the control unit 112 controls the receiving unit 111 to receive the connection status information on the components in the first network 100 from the local information center 160.

When the local information center 160 does not exist, the control unit 112 transmits a confirmation message to the components in the first network 100 via the receiving unit 111 using the unique information. Also, the connection status information on the components is acquired by receiving a response message in response to the confirmation message. As an example, the control unit 112 deletes unique information on a corresponding component in the storage space, when the corresponding component is not connected. When another component is connected, the control unit 112 adds unique information on the other component in the storage space, updates the unique information, and may output the updated unique information to the storage unit 113.

The control unit 112 receives the unique information from the storage unit 113. Also, the control unit 112 broadcasts the unique information to all components in the second network 170 via the receiving unit 111 when joining the second network 170.

The control unit 112 may transmit the unique information to a local information center 190 in the second network 170 via the receiving unit 111 to control the local information center 190 in the second network 170 to transmit the unique information to the all components in the second network 170.

The apparatus for discovering a component in at least one sub-network 110 may transmit the unique information on the components in the first network 100 to the components in the second network 170, as opposed to directly joining the second network 170, using a wireless communication method such as a Bluetooth, a Zigbee, a radio frequency identification (RFID) method, and an infrared communication.

The control unit 112 may control the components in the second network 170 or the local information center 190 in the second network 170 to receive the unique information from the local information center 160 in the first network 100, by transmitting the unique information on the local information center 160 in the first network 100 to the components in the second network 170 or the local information center 190 in the second network 170.

Figure 3:
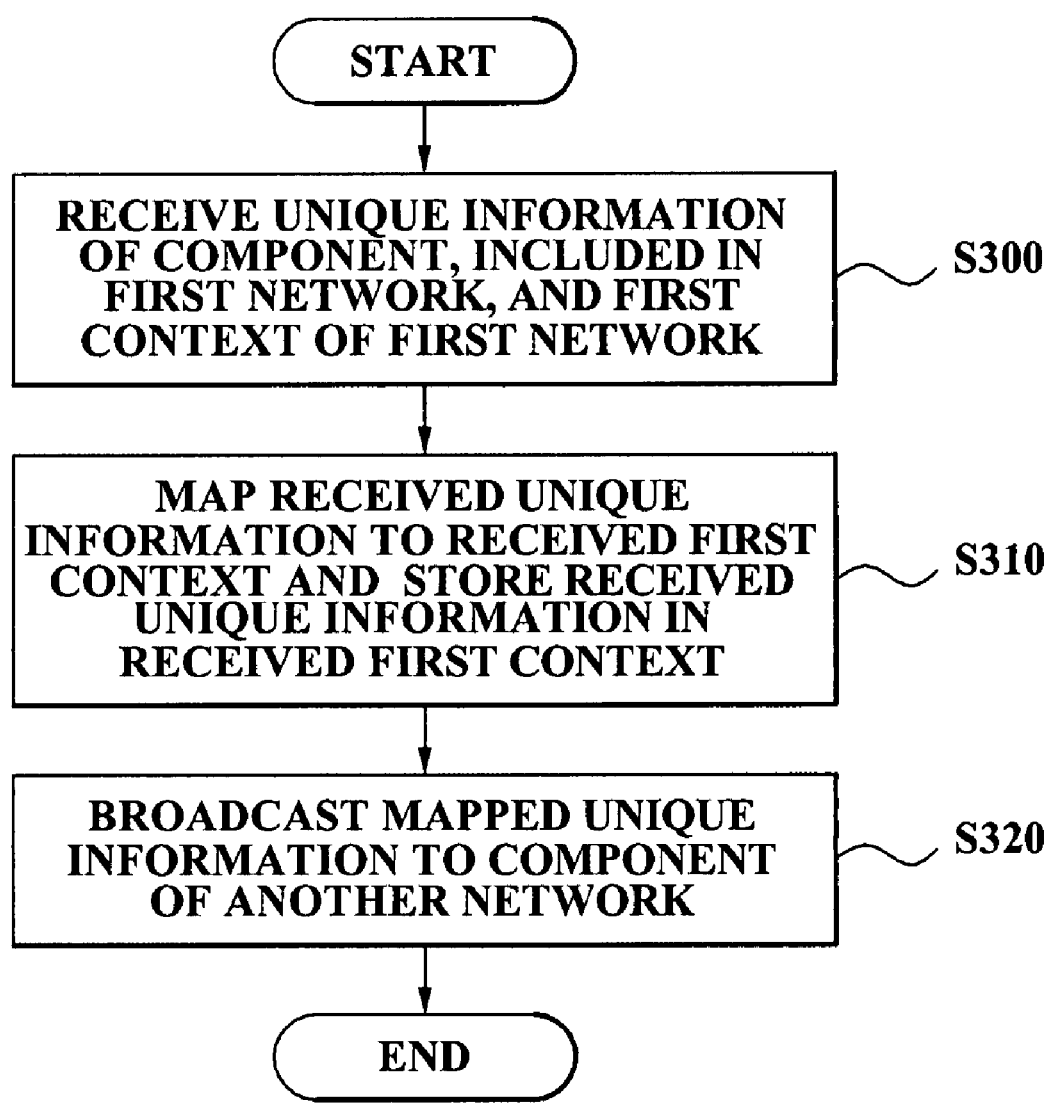
FIG. 3 is a flowchart illustrating a control method of an apparatus for discovering a component in at least one sub-network according to an exemplary embodiment of the present invention.

FIG. 3 is a flowchart illustrating a control method of an apparatus for discovering a component in at least one sub-network according to an exemplary embodiment of the present invention. Hereinafter, referring to FIG. 3, the method where the apparatus for discovering a component in at least one sub-network discovers the component in at least one sub-network is described.

In operation S300, information is collected by receiving unique information on all components, included in a first network, and a first context of the first network, when joining the first network of a plurality of networks.

In operation S310, a storage space of the first context is created. The storage space stores the received unique information on the components included in the first network. In this instance, the storage space is created by mapping the unique information to the first context.

In operation S320, the unique information is broadcasted. Here, the unique information may be broadcasted via a receiving unit or a local information center in a second network, when joining the second network. Conversely, as described above, unique information on components in a previous network may be broadcasted using a wireless communication method such as a Bluetooth, a Zigbee, and the like.

Accordingly, the components in the second network may discover the components in the first network and communicate with the components in the first network using the received unique information.

Figure 4:
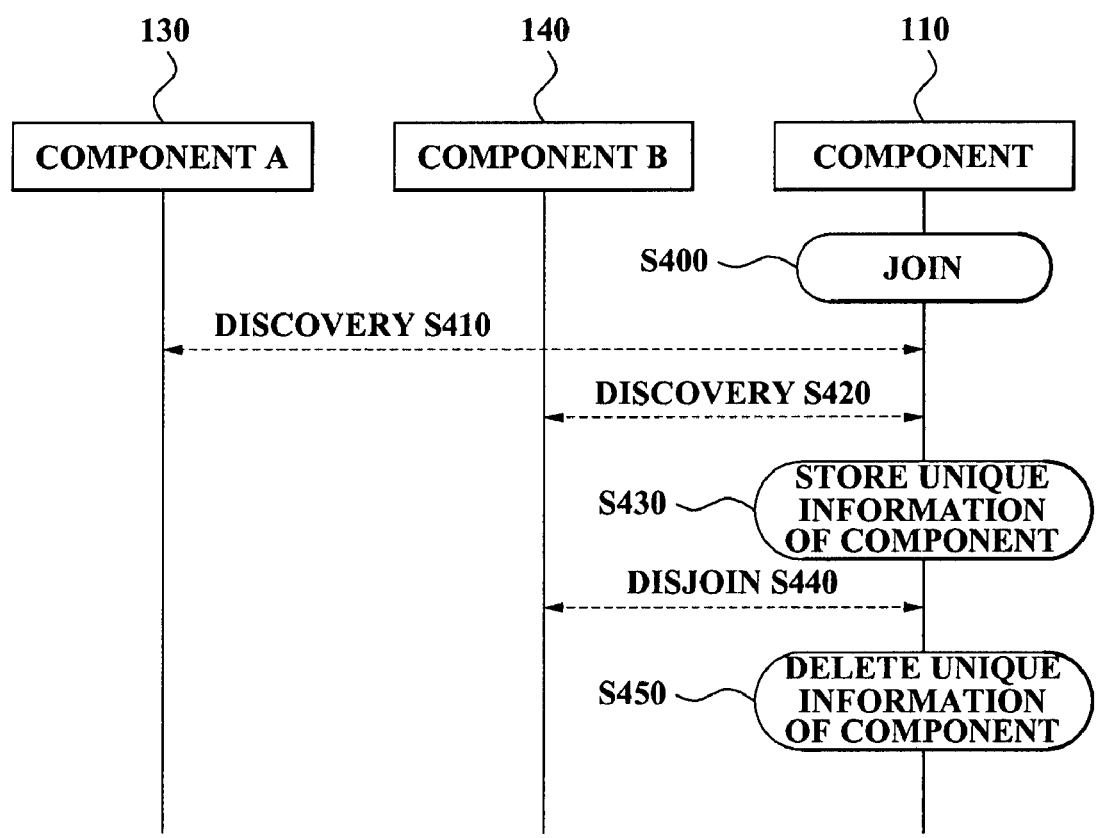
FIG. 4 is a diagram illustrating operation S310 of FIG. 3 in greater detail with regard to an entire network according to an exemplary embodiment of the present invention.

FIG. 4 is a diagram illustrating operation S310 of FIG. 3 in greater detail with regard to an entire network according to an exemplary embodiment of the present invention. Hereinafter, referring to FIG. 4, a method of embodying operation S310 is described.

A component A and a component B are included in a first network. In this instance, it is assumed that other components do not exist. When a random component joins the first network including the first context in operation S400, the component may discover the component A in operation S410 and the component B in operation S420, using a multicast discovery method. Here, the operation of discovery may be performed independent of joining the first network. Unique information on components is collected through the operation of discovery.

Also, the component stores unique information on the component A and the component B in the storage space of the first context in the storage unit in operation S430. When the component B leaves the first network in operation S440, the unique information on the component B is deleted in the storage space of the first context in operation S450.

Specifically, in FIG. 4, the component is operated as a collector, i.e. an apparatus for discovering a component in at least one sub-network according to an exemplary embodiment of the present invention.

Figure 5:
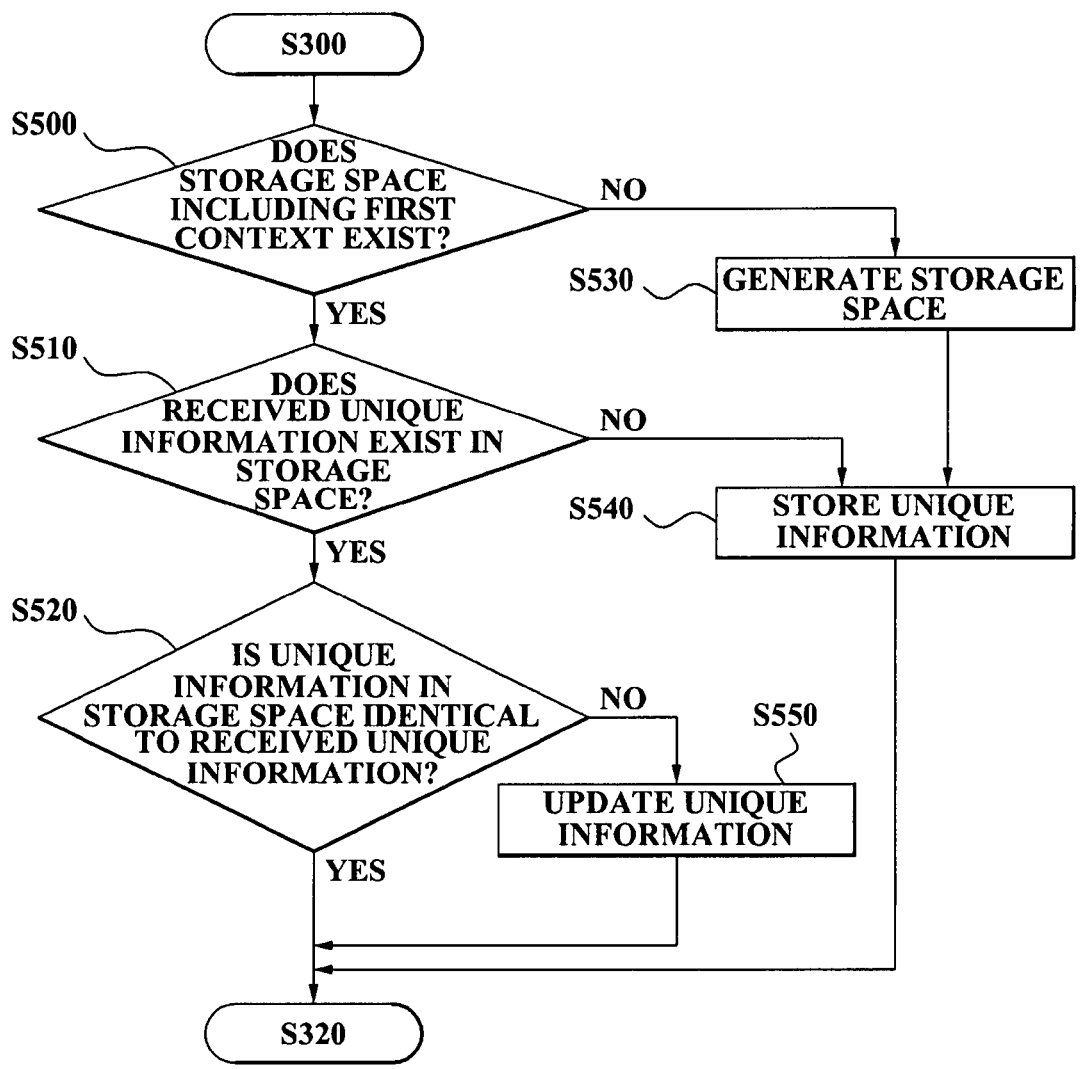
FIG. 5 is a flowchart illustrating operation S310 in greater detail with regard to an apparatus for discovering a component in at least one sub-network according to an exemplary embodiment of the present invention.

FIG. 5 is a flowchart illustrating operation S310 in greater detail with regard to an apparatus for discovering a component in at least one sub-network according to an exemplary embodiment of the present invention. Hereinafter, referring to 'FIG. 5'; a method of embodying operation S310 is described.

In operation S500, whether the storage space including the first context exists in the storage unit is determined. When the storage space including the first context exists in the storage unit, whether unique information on a component exists in the storage space of the first context is determined in operation S510. In this instance, the unique information on the component is received from the component in the first network.

In this instance, whether the unique information exists may be determined by confirming whether a received ID exists in the storage space.

In operation S520, when the received unique information on the component exists in the storage space of the first context, whether unique information on a component in the storage space is identical to the received unique information is confirmed. When the storage space including the first context does not exist in the storage unit, the storage space including the first context is generated in the storage unit in S530. After the unique information on the component which is received from the component of the first network is stored in the generated storage space in operation S540, and an operation of broadcasting is performed in operation S320.

When the received unique information on the component does not exist in the storage space, the received unique information on the component is stored in operation S540. The operation of broadcasting is then performed in operation S320. When the unique information on the component in the storage space is identical to the received unique information, the operation of broadcasting is performed in operation S320.

Also, when the unique information on the component in the storage space is different from the received unique information, the unique information on the component in the storage space is updated with the received unique information in operation S540. Then, the operation of broadcasting is performed in operation S320.

Figure 6:
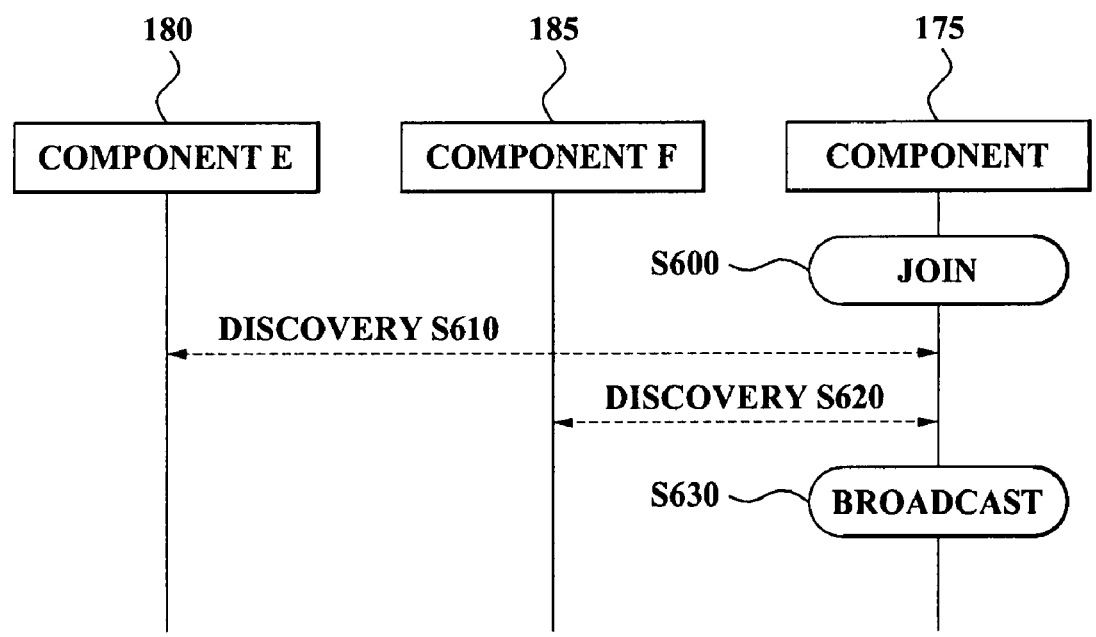
FIG. 6 is a diagram illustrating operation S320 in greater detail with regard to an entire network according to an exemplary embodiment of the present invention.

FIG. 6 is a diagram illustrating operation S320 in greater detail with regard to an entire network according to an exemplary embodiment of the present invention. Hereinafter, referring to FIG. 6, a method of embodying operation S320 is described.

When a component E and a component F are included in a second network, and a random component joins the second network including the second context in operation S600, the component may discover the component E in operation S610 and the component F in operation S620, using a multicast discovery method. Here, the operation of discovery may be performed independent of joining the second network. Unique information on components is collected through the operation of discovery.

In operation S630, the component broadcasts the unique information on the components in the first network stored in the storage space of the first context in the storage unit.

Specifically, in FIG. 6, the component is operated as a distributor, i.e. an apparatus for discovering a component in at least one sub-network according to an exemplary embodiment of the present invention. Also, as described above, the component in FIG. 4 may be used as the component in FIG. 6, which corresponds to a case when sub-networks, different from each other, are connected.

Figure 7:
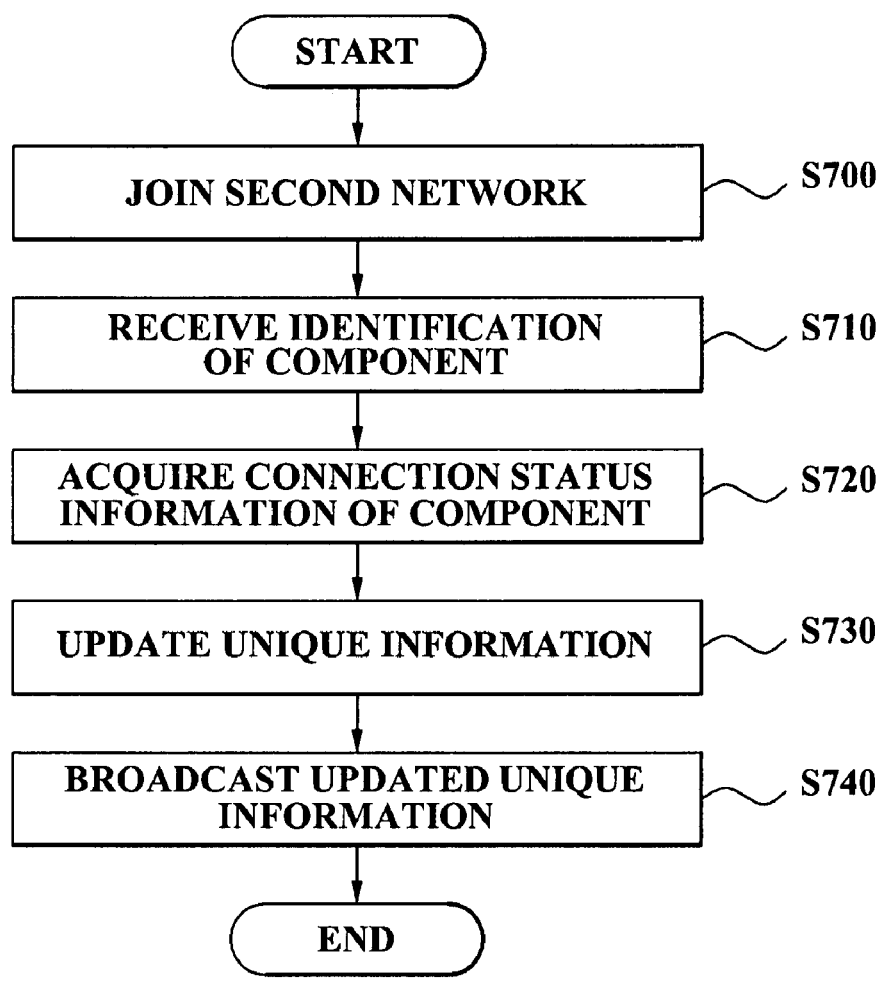
FIG. 7 is a flowchart illustrating operation S320 in greater detail with regard to an apparatus for discovering a component in at least one sub-network according to an exemplary embodiment of the present invention.

FIG. 7 is a flowchart illustrating operation S320 in greater detail with regard to an apparatus for discovering a component in at least one sub-network according to an exemplary embodiment of the present invention. Hereinafter, referring to FIG. 7, a method of embodying the operation S320 is described.

In operation S700, a component joins a second network. In operation S710, an ID of the component is received from components in the first network. IDs of the components of the first network may be received in the second network by using unique information on the components in a storage space.

In operation S720, whether the component corresponds to a local information center is confirmed through the received ID, and connection status information on the components is acquired as a result of the confirmation. In this instance, the local information center transmits the connection status information on the components in the first network. The local information center is referred to as a component where the unique information on the component is not changed.

In operation S730, the unique information in the storage space is updated using the acquired connection status information. In operation S740, the updated unique information is broadcasted. In this instance, the receiving the ID of the component and the confirming of whether the component is the local information center in operation S720 may be performed in the first network.

Also, since the component corresponds to the local information center, unique information on the component in the first network may be acquired by storing unique information on the local information center in the storage space, joining the second network, and requesting the local information center for the unique information on the components in the first network.

Figure 8:
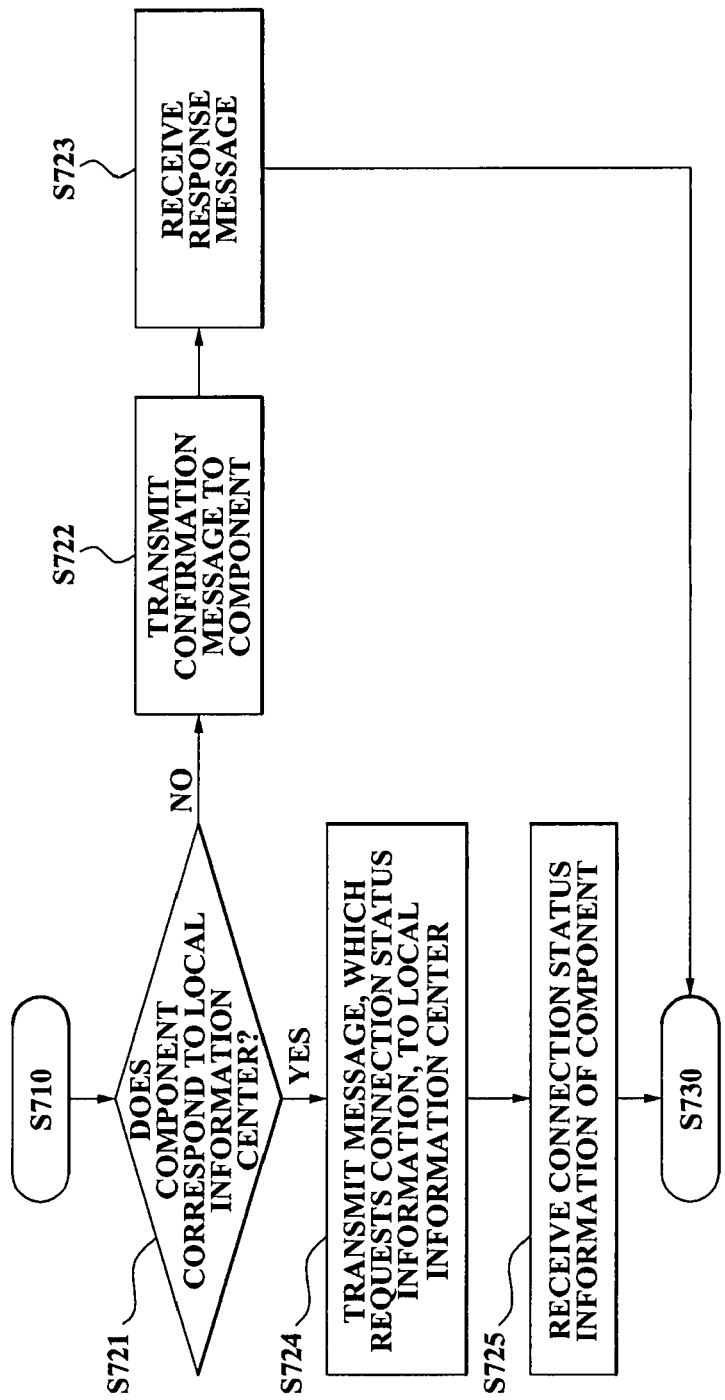
FIG. 8 is a flowchart illustrating operation S720 of FIG. 7 in greater detail with regard to an apparatus for discovering a component in at least one sub-network according to an exemplary embodiment of the present invention.

FIG. 8 is a flowchart illustrating operation S720 of FIG. 7 in greater detail with regard to an apparatus for discovering a component in at least one sub-network according to an exemplary embodiment of the present invention. Hereinafter, referring to FIG. 8, a method of embodying operation S720 is described.

In operation S721, whether a component corresponds to a local information center is determined. As a result of the determination in operation S721, when the component does not correspond to the local information center, a confirmation message, which confirms a connection status of the component, is transmitted to the component in operation S722. In operation S723, a response message is received from the component. In operation S730, unique information is updated.

As the result of the determination in operation S721, when the component corresponds to the local information center, a message, which requests connection status information on the component, is transmitted to the local information center in operation S724. In operation S725, the connection status information on the component is received. In operation S730, the unique information is updated.

According to an exemplary embodiment of the present invention, in a method and apparatus for discovering a component in at least one sub-network, a component stores unique information on all components in a network where a component previously joins, in a storage space of a context, which distinguishes at least one network from another network, transmits the unique information to a newly joined network, and thereby may mutually discover components in networks different from each other. Specifically, a discovery in sub-networks may be available without a separate action to process a multicast packet by existing routers.

Also, according to an exemplary embodiment of the present invention, a method and apparatus for discovering a component in at least one sub-network may discover the component using information about a single component when another component has the information about the single component, even though the single component is not previously discovered when a plurality of sub-networks exist. Specifically, a variety of scenarios may be assumed when an ad hoc network activates. That is, a mutual discovery may be available using information about a single device when another device has the information about the single device, even though the single device is not discovered when the plurality of sub-networks exist.

Also, according to an exemplary embodiment of the present invention, a method and apparatus for discovering a component in at least one sub-network store common information, which is unique information on all components in a previously joined network, in a storage space of a context distinguishing a plurality of networks, transmit the common information to another network, and thereby may discover a component, which has a random IP address, and a device, which is not registered in a DNS, when an IP address, an identifier, and a port number may not be ascertained using the DNS, similar to when an ad hoc network is utilized.

Also, according to an exemplary embodiment of the present invention, a method and apparatus for discovering a component in at least one sub-network may reduce a complexity of a discovery process independent of a DNS even when a device or a component is already registered in the DNS, and may enable a user to easily differentiate previously discovered devices using a single context instead of unorderly storing the previously discovered devices.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of discovering a component in a sub-network, the method comprising:
  receiving first information on at least one component included in a first sub-network of a network, and second information on the first sub-network, by a first component when the first component joins the first sub-network;

determining whether other information which identifies the at least one component exists in a storage space for the second information;

determining whether the other information comprises the first information when the other information exists in the storage space;

updating the other information in the storage space with the first information when the other information in the storage space does not comprise the first information; and broadcasting the first information to all components included in a second sub-network of the network by the first component to enable all the components included in the second sub-network to discover the at least one component included in the first sub-network if the first component joins the second sub-network, wherein the first information comprises an Internet protocol (IP) address of the at least one component included in the first sub-network.

2. The method of claim 1, wherein the second information comprises at least one of a location, a structure, an address and a predetermined name of the first sub-network.

3. The method of claim 1, further comprising:
generating the storage space for the second information, if the storage space does not exist; and
storing the at least one of the first information and the second information in the storage space.

4. The method of claim 1, further comprising storing the at least one of the first information and the second information in the storage space, if the other information does not exist in the storage space.

5. The method of claim 1, wherein the broadcasting of the first information to the second sub-network comprises:
acquiring connection status information of the at least one component;
updating the first information using the connection status information; and
broadcasting the updated first information.

6. The method of claim 5,
wherein the connection status information is acquired by a local information center included in the first sub-network, and
wherein information on the local information center with respect to the first sub-network is not changed.

7. The method of claim 6, further comprising:
receiving an identification of a component from the at least one component included in the first sub-network; and
determining whether the component corresponds to a local information center using the identification.

8. The method of claim 7, wherein the acquiring of the connection status information comprises:
transmitting a message, which requests the connection status information, to the local information center, if the component corresponds to the local information center; and
receiving the connection status information.

9. The method of claim 7, wherein the acquiring of the connection status information comprises:
transmitting a confirmation message, which confirms a connection status of the at least one component, to each of the at least one component, if the component does not correspond to the local information center; and
receiving a response message with respect to the confirmation message.

10. The method of claim 6, wherein the first component is the local information center.

11. The method of claim 1, wherein the broadcasting of the first information to the second sub-network comprises transmitting the first information to at least one component included in the second sub-network.

12. The method of claim 11,
wherein the transmitting of the first information is performed via a local information center included in the second sub-network, and
wherein information on the local information center with respect to the second sub-network is not changed.

13. The method of claim 1, wherein the first sub-network uses a multicast discovery method in receiving the first information.

14. An apparatus for discovering a component in a sub-network, the apparatus comprising:
a receiving unit which receives first information on at least one component included in a first sub-network of a network, and second information on the first sub-network, when the apparatus joins the first sub-network;
a storage unit which determines whether other information which identifies the at least one component exists in a storage space for the second information, and determines whether the other information comprises the first information when the other information exists in the storage space, and updates the other information in the storage space with the first information when the other information in the storage space does not comprise the first information; and
a control unit which broadcasts the first information to all components included in a second sub-network of the network to enable all the components included in the second sub-network to discover the at least one component included in the first sub-network if the apparatus joins the second sub-network,
wherein the first information comprises an Internet protocol (IP) address of the at least one component included in the first sub-network.

15. The apparatus of claim 14, wherein the second information comprises at least one of a location, a sub-structure, an address and a predetermined name of the first sub-network.

16. The apparatus of claim 14, wherein the apparatus for discovering a component in a sub-network operates as a collector in the first network, and operates as a distributor in the second network.

17. The apparatus of claim 14, wherein the sub-network comprises at least one of an ad hoc network and a home network.

18. A method of discovering a component in a sub-network, the method comprising:
receiving first information comprising an Internet Protocol (IP) address on at least one component included in a first sub-network of a network, and second information on the first sub-network, by a local information center when the local information center joins the first sub-network;
determining whether other information which identifies the at least one component exists in a storage space for the second information;
determining whether the other information comprises the first information when the other information exists in the storage space;
updating the other information in the storage space with the first information when the other information in the storage space does not comprise the first information; and
broadcasting the first information to all components included in a second sub-network of the network by the local information center to enable all the components included in the second sub-network to discover the at least one component included in the first sub-network if the local information center joins the second sub-network,
wherein the broadcasting of the first information to the second sub-network comprises:

acquiring connection status information of the at least one component;
updating the first information using the connection status information; and
broadcasting the updated first information.

* * * * *